April 28, 1970   W. A. WHITFILL, JR   3,509,522

SHATTERPROOF HYDROPHONE

Filed May 3, 1968

William A. Whitfill, Jr.
INVENTOR.

United States Patent Office 3,509,522
Patented Apr. 28, 1970

3,509,522
SHATTERPROOF HYDROPHONE
William A. Whitfill, Jr., Houston, Tex., assignor to Schlumberger Technology Corporation, New York, N.Y., a corporation of Texas
Filed May 3, 1968, Ser. No. 726,373
Int. Cl. H01r 17/00; H01v 7/00
U.S. Cl. 340—10                                      6 Claims

ABSTRACT OF THE DISCLOSURE

Disclosed is a new type of marine seismic transducer designed to continue efficient operation even if the sensing element is fractured. A series of coaxially aligned cylindrical elements comprise the transducer as follows: an inner conducting electrode; a bonding layer of conducting material; a seismic wave sensing element; and outer electrode of conducting metal; and appropriate housing means for the above.

BACKGROUND OF THE INVENTION

This invention relates to a new and improved type of seismic transducer for use in seismic prospecting for geological structures disposed beneath a body of water. It is common practice in this type of prospecting for a boat to tow a submerged cable or streamer containing a plurality of pressure sensitive transducers through the body of water and to utilize these transducers to sense seismic pressure waves reflected from geological structures disposed beneath the water. The reflected seismic waves are produced upon the reflection of induced periodic disturbances from subsurface geological boundaries.

Usually, explosives of vibratory means are utilized for the generation of the incident seismic pressure waves. Since these pressure waves must penetrate to great depths in the geological structures disposed beneath the water in order to provide useful information of the shape of these structures, it is apparent that the reflected seismic pressure waves will be greatly attenuated as they traverse their return path to the pressure sensing transducers being towed by the prospector. It is therefore essential that highly sensitive pressure transducers be utilized for the reception of these reflected waves.

One such highly sensitive pressure transducer typically consists of a piezoelectric element arranged in such a manner that the pressure variations of the reflected seismic waves cause a stress in the material. A voltage is then produced across the material which is proportional to the pressure variations of the impinging wave front. An arrangement commonly used is that of a hollow cylinder or tubular member in which pressure variations are allowed to act only on the external surface of the cylinder, thus placing a stress upon the piezoelectric material, typically a ferroelectric material. Silver electrodes are deposited on the internal and external surface of the cylinder thus providing output terminals for the induced voltages. Such an arrangement has the advantage of having a high electrical capacitance and good sensitivity, neither of which varies with hydrostatic pressure.

A high electrical capacitance is essential in such transducers because these devices generally work into a low impedance load such as a power amplifier, and thus must be capable of driving such a load. Additionally, a high sensitivity or the production of a high induced voltage per unit of incident pressure differential is desirable in order to detect the weakest reflected seismic waves from maximum depths. It may be shown that for such a cylindrical shaped form, the sensitivity is a function of the outer radius of the cylinder and of the thickness of the cylindrical walls in such a manner that the greater the outer radius and the thinner the wall, the greater will be the sensitivity of the cylinder.

Unfortunately, ferroelectric materials typically used in such transducers such as barium titanate or lead zirconate are extremely brittle and subject to fracture under light shock loads even during fabrication. This disadvantage is further amplified by the environment in which these devices are used. Being towed in a cable or streamer behind a prospecting boat, such transducers are subject to being reeled in and out by winches, jarred as they are pulled over the side or even being stepped on as they lie upon the deck of the boat. Thus prior art devices of this type have had relatively short useful lifetimes.

In an attempt to obviate these difficulties, prior art devices have resorted to various attempts in packaging to avoid the breakage of the ceramic piezoelectric elements. Various types of protective cases have been provided for shielding the external cylinder surface from shock and various support structures for the internal wall of the cylinder have been devised. Also thicker and more rugged sensing elements have been used. While these attempts have met with some success, this has been at the cost of reducing the effectiveness of the transducer because by insulating it from external shock, it is also insulated from pressure variations desired to be detected. Further, supporting the internal walls of the cylinder causes the support material to carry some of the stresses which the sensing element would otherwise carry and thereby reduces its sensitivity. Finally, increasing the wall thickness of the cylindrical sensing element decreases its sensitivity as previously discussed.

To obtain a transducer having optimized sensitivity, the present invention utilizes a relatively thin-walled sensing element and relatively nonabsorbent and nondesensitizing support members. Although this packaging may result in fracture of the sensing element, the construction of the present invention is such that the fracture of the sensing element will not materially affect the sensitivity or capacitance of the transducer.

Accordingly, it is an object of this invention to provide a new and improved seismic transducer for use in marine seismic cables whose sensitivity is not affected by the fracture of its sensing element.

SUMMARY OF THE INVENTION

The present invention utilizes a plurality of coaxially aligned cylindrical elements of increasing diameter. The construction, from the inner element to the outer element, comprises; an inner electrode, preferably a good electrically conducting metal such as copper or aluminum. The next element is a layer of conductive bonding material such as a silver impregnated epoxy compound. Overlying the bonding material is a seismic wave sensing element, preferably of ferroelectric ceramic material such as barium titanate or lead titanate-lead zirchonate solid solutions. An outer electrode of a good electrical conductor metal such as copper or aluminum surrounds the sensing element. An outer protective housing and sealing layer of a vinyl type material such as urethane encloses the elements.

If desired, a hollow support layer of insulating material can be disposed inside the inner electrode and will cooperate with the outer housing to enclose the elements. An air space is left between this inner support layer and the inner electrode. This layer of material may, for example, be nylon or Delrin plastic.

The use of the conductive bonding layer permits efficient operation of the transducer even if the sensing element is fractured. These results are obtained because any fractured fragments are held in intimate contact by this layer, preserving the sensitivity and high electrical capacitance of the device.

The novel features of the present invention are set forth with particularity in the appended claims. The present invention, both as to its organization and manner of operation together with further objects and advantages thereof, may best be understood by way of illustration and example of embodiments when taken in conjunction with the accompanying drawings.

DESCRIPTION OF THE PREFERRED EMBODIMENTS

The present invention is a new type of acoustical wave transducer or hydrophone for use in marine seismic prospecting.

Figure 1:
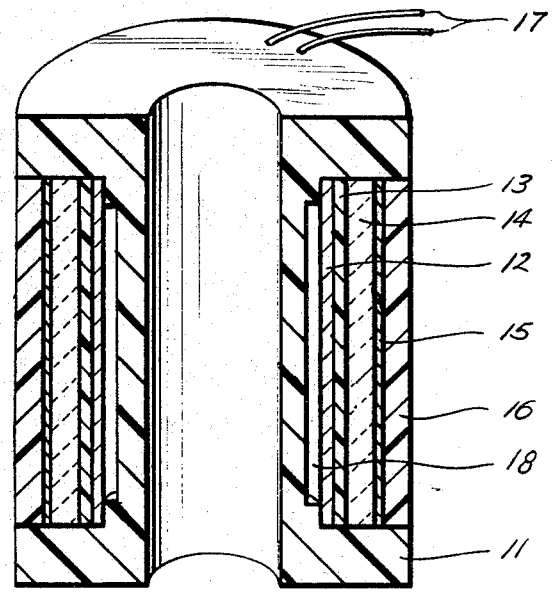
FIGURE 1 is a schematic cross-sectional view of one embodiment of the present invention showing the various layers of coaxially aligned cylinders comprising the transducer and one type of protective housing used.

Referring now to the embodiment of the present invention illustrated in FIGURE 1, a plastic or nylon spool 11 forms an inner sealing support for a plurality of overlying elements 12-16. Inner electrode element 12 is a very thin metallic sleeve made of a good electrical conductor such as copper or aluminum. This electrode is purposefully constructed to be very thin so that while it gives some support to the inner wall of the sensing element 14, it will not carry too much of the stress induced in sensing element 14 by impinging seismic pressure waves and thereby reduce its sensitivity undesirably. A desirable range of thickness for this purpose has been determined to be between .030 inch and .010 inch. Air space 18 permits pressure differentials to exist across the overlying cylindrical structure when seismic pressure waves impinge upon its outer surface.

Conductive bonding layer 13 is used to secure and firmly bond the entire internal surface of sensing element 14 to the external surface of inner electrode 12. Preferably, bonding layer 13 is of a conductive epoxy compound such as "K20" available from Hysol Corporation, Olean, N.Y.

Bonding layer 13 has the property of possessing a high tensile strength with respect to that of sensing element 14. Additionally, it attaches itself to the internal surface of sensing element 14 and the external surface of inner electrode 12 so securely as to form a molecular bond with the molecules of these elements. A blow to the assembly which might be of sufficient impact to fracture sensing element 14 would not fracture bonding layer 13, being of a much higher tensile strength, and being itself bonded firmly to resilient inner electrode 12. This combination of properties of bonding layer 13 would then serve to maintain fractured pieces of sensing element 14 in intimate contact with each other.

Recalling that effective operation of the transducer requires the preservation of two of its important properties, namely, its electrical capacitance and its sensitivity, the following adverse results upon fracture of the sensing element should be noted:

(1) If the fractured pieces are not in intimate contact (i.e., touching) with each other, then the ceramic sensing element is no longer in the form of a cylinder, and the stress in each piece would not be as great as that in cylindrical form. This results in less sensitivity because of the loss of the inherent multiplication of stresses offered by the cylindrical form as opposed to a flat or curvlinear form of piezoelectric materials.

(2) Breakage of the cylinder (in the case of prior art transducers with deposited silver electrodes) breaks the electrical contact between the fractured pieces. This decrease of effective surface area results in a decrease of the total capacitance of the unit and hence impairs its ability to drive a low impedance load.

The action of bonding layer 13 is to impair, if not totally prevent, both these undesirable results of sensing element 14 fracture as follows:

(a) Bonding layer 13 holds fractured portions of sensing element 14 in intimate contact with each other even after fracture. This retains essentially the cylindrical geometrical shape of sensing element 14, thus still allowing the inherent multiplication of stresses of such a form and preventing the loss of sensitivity which would occur if the fractured pieces were permitted to slide apart, thus forming flat or erratically shaped curvlinear sections of piezoelectric material.

(b) Bonding layer 13 being conductive in nature allows the retention of electrical contact with all pieces of fractured sensing element 14 and thereby preserves the electrical capacitance of sensing element 14. This has the effect of simply paralleling the electrical capacitance of all fractured pieces of sensing element 14 and thus no capacitance is lost.

The above features maintain the electrical and mechanical integrity of the structure.

Outer electrode 15 is a thin layer made of a good electrically conducting metal such as copper or aluminum. Typically, this metal may be in the form of a tape, such as tape No. X-1181 available from the 3M Corporation, St. Paul, Minn., and may be wrapped about the sensing element 14. The tape metal may have a conductive adhesive coating (i.e., 30 of FIGURE 2), if desired, for easy attachment to the outer surface of sensing element 14. This electrode provides electrical contact with the entire outer surface of sensing element 14 and, additionally, its enclosure about bonding layer 13 and sensing element 14 assists in preventing movement of fractured pieces of sensing element 14.

Outer protective covering layer 16 is provided to protect the surface of outer electrode 15 from oxidation and additionally, to provide a fluid seal should it be desired to use the present invention in a fluid filled cable. Protective covering layer 16 is typically of a soft vinyl material such as urethane and is potted or molded over the otherwise finished transducer. Covering layer 16, being relatively soft, does not absorbently shield sensing element 14 from weak pressure waves and thus undesirably decrease its sensitivity. Electrical leads 17 contact electrodes 12 and 15 and allow transmission of the developed signals.

The embodiment shown in FIGURE 1 is particularly useful for mounting in a marine seismic cable or streamer. Such cables typically contain a plurality of transducers mounted in spaced relationship along their length. The electrical leads from succeeding transducers may easily be passed through the hollow center of the coaxially aligned cylinders of this embodiment.

Figure 2:
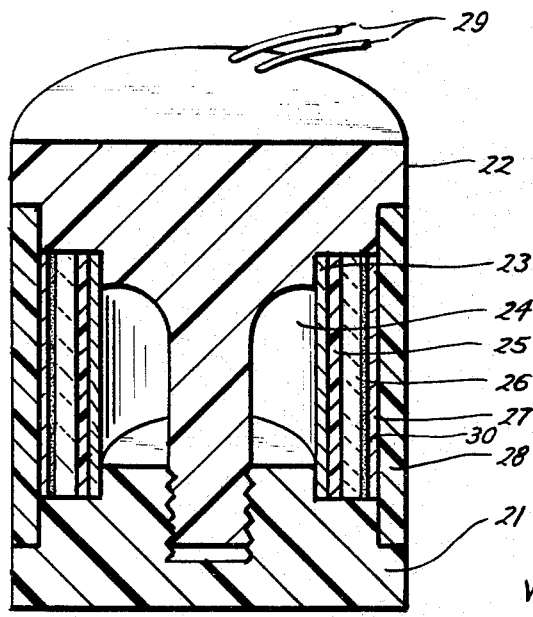
FIGURE 2 is a schematic cross-sectional view of another embodiment of the present invention showing its various layers and a type of protective housing enabling the quick replacement of a transducer element should it become necessary to do so.

Referring now to FIGURE 2, another embodiment of the present invention is shown. A two piece, screwably connectable housing comprising a top portion 22 and a bottom portion 21 is used to enclose the coaxially aligned cylindrical transducer elements. Variations in pressure between air space 24 and the outer surface of the device occurring when a seismic pressure wave impinges upon the outer surface, are again sensed as voltages induced across ceramic piezoelectric sensing element 26. Inner electrode 23 is analogous to inner electrode 12 in FIGURE 1, conductive bonding layer 25 is analogous to conductive bonding layer 13 in FIGURE 1, outer electrode 27 is annalogous to electrode 15 in FIGURE 1 and covering layer 28 is analogous to covering layer 16 in FIGURE 1. Electrical leads 29 contact electrodes 23 and 27 and allow transmisison of the developed signals. The embodiment shown in FIGURE 2 has the additional advantage that the entire sensing assembly may be changed very quickly by simply unscrewing the two portions 21 and 22 of the housing assembly and replacing the sensing assembly.

Tests of the present invention, such as by hitting a completed assembly with a ball peen hammer to simulate working conditions, produced fracturing in the ceramic sensing element but, nonetheless, the transducer suffered negligible loss in electrical capacity or in sensitivity. In all other respects, the transducer reamined completely usable and operable.

While particular embodiments of the present invention have been shown and described, it is apparent that changes may be made without departing from this invention in its broader aspects; and, therefore, the aim in the appended claims is to cover all such changes and modifications as fall within the true spirit and scope of this invention.

What is claimed is:

1. A transducer for sensing acoustic wave energy comprising: a frangible cylindrical acoustic wave sensing element; an outer tubular metallic electrode about the outer surface of said sensing element; an inner tubular metallic electrode disposed in a snug fitting relationship with the inner surface of said sensing element; electrically conductive bonding means for bonding said inner electrode to the inner surface of said sensing element, said bonding means functioning in case of fracture of said sensing element to hold the pieces thereof in intimate contact and preserve the sensitivity of said sensing element.

2. The transducer of claim 1 wherein said cylindrical sensing element consists of a ceramic piezoelectric element.

3. The transducer of claim 1 including means for housing said sensing element and said electrodes in order to electrically insulate and otherwise protect them from their external environment.

4. A transducer for sensing acoustic waves comprising: a plurality of hollow coaxial cylindrical layers said layers including from innermost to outermost layer;
  (a) an inner electrically conducting, thin-walled support layer forming an inner electrode;
  (b) a bonding layer of electrically conductive bonding material;
  (c) a ceramic piezoelectric sensing layer;
  (d) a thin-walled electrically conducting metal layer in touching contact with the other surface of said sensing layer; and
  (e) an outer sealing layer of electrically insulating sealing material;
conductor means for establishing individual electrical contact with said inner thin-walled supporting layer and with said thin-walled conducting metal layer; and insulating capping means sealing enclosing the exposed ends of said plurality of hollow coaxial cylindrical layers, said conductor means extending through said capping means.

5. A transducer adapted for use in marine seismic cables for sensing reflected seismic wave energy comprising: a thin-walled, tubular acoustic wave sensing element constructed of a frangible piezoelectric material; an inner, metallic, sleeve support member disposed coextensively along the inner wall surface of said tubular sensing element and bonded thereto with electrically conductive bonding means forming an inner supporting electrode; an outer thin-walled, metallic tape layer disposed coextensively along the outer wall surface of said sensing element and adhered thereto by a conductive adhesive means, said inner support member with its bonding means and said outer metallic tape layer with its adhesive means forming a laminated structure on both lateral surfaces of said tubular sensing element which functions in the event of fracture of said sensing element to retain all fractured pieces in intimate contact with each other thereby preserving the mechanical integrity and the sensitivity of said sensing element and further functioning to maintain electrical contact with both inner and outer lateral surfaces of all fractured pieces of said sensing element, thereby preserving the capacitance of said sensing element.

6. A transducer assembly comprising:
  a piezoelectric ceramic tube capable of being stressed by acoustic wave energy impinging on its external surface and producing a potential difference between its lateral inner and outer surfaces which is representative of the impinging acoustic wave energy;
  a thin-walled metallic cylinder disposed coextensive with the lateral inner surface of said tube and in snug fitting relationship therewith for providing a semi-rigid backing and for supporting a portion of the external stress on said tube without seriously impairing the sensitivity of said tube to seismic waves;
  conductive bonding means for bonding said cylinder to said tube, said bonding means and said cylinder forming an inner surface electrode on said tube; and
  means for providing an outer surface electrode on the lateral outer surface of said tube, whereby in the event of fracture of said tube said bonding means and said cylinder prevent fractured pieces of said tube from moving with respect to each other, thereby preserving the cylindrical form and sensitivity to impinging acoustic waves of said tube.

References Cited

UNITED STATES PATENTS

| | | | |
|---|---|---|---|
| 3,051,927 | 8/1962 | Mazzagatti | 340—10 X |
| 3,054,084 | 9/1962 | Parssinen et al. | 340—10 X |
| 3,068,446 | 12/1962 | Ehrlich et al. | 340—10 X |
| 3,166,730 | 1/1965 | Brown et al. | 340—10 |
| 3,167,668 | 1/1965 | Nesh | 340—10 |
| 3,202,962 | 8/1965 | Elston | 340—10 |

RICHARD A. FARLEY, Primary Examiner

B. L. RIBANDO, Assistant Examiner

U.S. Cl. X.R.

310—8.7

UNITED STATES PATENT OFFICE
CERTIFICATE OF CORRECTION

Patent No. 3,509,552

April 28, 1970

James M. Donnelly

It is certified that error appears in the above identified patent and that said Letters Patent are hereby corrected as shown below:

Column 7, line 40, "duration" should read -- direction --.

Signed and sealed this 29th day of December 1970.

(SEAL)
Attest:

Edward M. Fletcher, Jr.
Attesting Officer

WILLIAM E. SCHUYLER, JR.
Commissioner of Patents